US010205177B2

(12) United States Patent
Okuno et al.

(10) Patent No.: US 10,205,177 B2
(45) Date of Patent: Feb. 12, 2019

(54) POROUS METAL BODY, METHOD FOR MANUFACTURING POROUS METAL BODY, AND FUEL CELL

(71) Applicants: SUMITOMO ELECTRIC INDUSTRIES, LTD., Osaka-shi, Osaka (JP); SUMITOMO ELECTRIC TOYAMA CO., LTD., Imizu-shi, Toyama (JP)

(72) Inventors: Kazuki Okuno, Itami (JP); Tomoyuki Awazu, Itami (JP); Masahiro Kato, Itami (JP); Masatoshi Majima, Itami (JP); Kengo Tsukamoto, Imizu (JP); Hitoshi Tsuchida, Imizu (JP); Hidetoshi Saito, Imizu (JP)

(73) Assignees: SUMITOMO ELECTRIC INDUSTRIES, LTD., Osaka-shi, Osaka (JP); SUMITOMO ELECTRIC TOYAMA CO., LTD., Imizu-shi, Toyama (JP)

( * ) Notice: Subject to any disclaimer, the term of this patent is extended or adjusted under 35 U.S.C. 154(b) by 293 days.

(21) Appl. No.: 14/901,183

(22) PCT Filed: Apr. 9, 2014

(86) PCT No.: PCT/JP2014/060251
§ 371 (c)(1),
(2) Date: Dec. 28, 2015

(87) PCT Pub. No.: WO2014/208176
PCT Pub. Date: Dec. 31, 2014

(65) Prior Publication Data
US 2016/0156045 A1 Jun. 2, 2016

(30) Foreign Application Priority Data

Jun. 27, 2013 (JP) ................................. 2013-134817

(51) Int. Cl.
| H01M 4/64 | (2006.01) |
| H01M 8/0245 | (2016.01) |
| C25D 1/08 | (2006.01) |
| C25D 5/12 | (2006.01) |
| C22C 13/00 | (2006.01) |
| C22C 19/05 | (2006.01) |
| C25D 5/14 | (2006.01) |
| C25D 5/50 | (2006.01) |
| C23F 17/00 | (2006.01) |
| H01M 8/0232 | (2016.01) |
| H01M 8/0206 | (2016.01) |
| H01M 8/0226 | (2016.01) |
| C25D 3/04 | (2006.01) |
| C25D 3/12 | (2006.01) |
| C25D 3/30 | (2006.01) |
| C23C 18/16 | (2006.01) |
| C23C 18/32 | (2006.01) |

(52) U.S. Cl.
CPC .......... H01M 8/0245 (2013.01); C22C 13/00 (2013.01); C22C 19/05 (2013.01); C23F 17/00 (2013.01); C25D 1/08 (2013.01); C25D 5/12 (2013.01); C25D 5/14 (2013.01); C25D 5/50 (2013.01); C25D 5/505 (2013.01); H01M 8/0206 (2013.01); H01M 8/0226 (2013.01); H01M 8/0232 (2013.01); C23C 18/1653 (2013.01); C23C 18/1657 (2013.01); C23C 18/32 (2013.01); C25D 3/04 (2013.01); C25D 3/12 (2013.01); C25D 3/30 (2013.01); Y02P 70/56 (2015.11)

(58) Field of Classification Search
CPC ............. H01M 8/0245; H01M 8/0206; H01M 8/0226; H01M 8/0232; C22C 13/00; C22C 19/05; C23F 17/00; C25D 1/08; C25D 5/12; C25D 5/14; C25D 5/505; Y02P 70/56

See application file for complete search history.

(56) References Cited

U.S. PATENT DOCUMENTS

| 2013/0108947 A1 | 5/2013 | Okuno et al. | |
| 2013/0266862 A1* | 10/2013 | Okuno | B32B 15/01 429/211 |
| 2013/0295459 A1* | 11/2013 | Nishimura | B22F 3/1137 429/211 |
| 2014/0087206 A1* | 3/2014 | Okuno | H01M 4/80 428/613 |

FOREIGN PATENT DOCUMENTS

| CN | 1133895 A | 10/1996 | |
| CN | 102255084 A | 11/2011 | |
| DE | 11 2011 102601 T5 | 5/2013 | |
| EP | 2 902 514 A1 | 8/2015 | |
| JP | S55-18579 A | 2/1980 | |
| JP | H11-154517 A | 6/1999 | |
| JP | 2009/187887 A | 8/2009 | |
| JP | 2012-132083 A | 7/2012 | |
| JP | 2012-149282 * | 8/2012 | ............... C25D 1/08 |
| JP | 2012-149282 A | 8/2012 | |
| WO | WO-2013/099532 A1 | 7/2013 | |
| WO | WO-2014/050536 A1 | 4/2014 | |
| WO | WO 2014/203594 A1 | 12/2014 | |

* cited by examiner

Primary Examiner — Raymond Alejandro
(74) Attorney, Agent, or Firm — Drinker Biddle & Reath LLP

(57) ABSTRACT

A porous metal body is provided that is inexpensive, usable for an electrode of a fuel cell or the like, and has excellent corrosion resistance. There is provided a porous metal body for a fuel cell, which is a sheet-shaped porous metal body, including at least nickel, tin, and chromium, in which the chromium concentration of at least one surface of the porous metal body is 3% to 50% by mass. In the porous metal body, preferably, the chromium concentration of one surface is higher than the chromium concentration of another surface.

5 Claims, No Drawings

POROUS METAL BODY, METHOD FOR MANUFACTURING POROUS METAL BODY, AND FUEL CELL

TECHNICAL FIELD

The present invention relates to a porous metal body which can be used, for example, as a current collector for various batteries, capacitors, fuel cells, and the like, a method for manufacturing a porous metal body, and a fuel cell that uses the porous metal body.

BACKGROUND ART

As a method for manufacturing a porous metal body having a high porosity and a large surface area, a method is known in which a metal layer is formed on the surface of a resin porous body, such as a resin foam. For example, Japanese Unexamined Patent Application Publication No. 11-154517 (Patent Literature 1) describes a method for manufacturing a porous metal body in which a resin porous body is subjected to electrical conduction treatment, an electroplating layer composed of a metal is formed thereon, and as necessary, the resin porous body is removed by burning.

Furthermore, Japanese Unexamined Patent Application Publication No. 2012-132083 (Patent Literature 2) proposes a porous metal body composed of a nickel-tin alloy as the porous metal body which has oxidation resistance, corrosion resistance, and a high degree of porosity and which is suitable as a current collector for various batteries, capacitors, fuel cells, and the like. Moreover, Japanese Unexamined Patent Application Publication No. 2012-149282 (Patent Literature 3) proposes a porous metal body composed of a nickel-chromium alloy as the porous metal body having high corrosion resistance.

CITATION LIST

Patent Literature

PTL 1: Japanese Unexamined Patent Application Publication No. 11-154517
PTL 2: Japanese Unexamined Patent Application Publication No. 2012-132083
PTL 3: Japanese Unexamined Patent Application Publication No. 2012-149282

SUMMARY OF INVENTION

Technical Problem

In recent years, there have been increased demands for higher output and higher capacity (smaller size) in various batteries, capacitors, fuel cells, and the like, and accordingly, there have also been demands for improvements in oxidation resistance and corrosion resistance in porous metal bodies constituting current collectors. In particular, in the case where the existing porous metal body is used for an electrode of a fuel cell, since a strong acid is generated from a membrane electrode assembly (MEA), it is required to further enhance corrosion resistance.

In view of the problem described above, it is an object of the present invention to inexpensively provide a porous metal body which is usable for an electrode of a fuel cell and which has excellent corrosion resistance.

Solution to Problem

In order to resolve the problem described above, the present invention employs the following structures.

That is, (1) according to an embodiment of the present invention, a porous metal body for a fuel cell, which is a sheet-shaped porous metal body, includes at least nickel, tin, and chromium, in which the chromium concentration of at least one surface of the porous metal body is 3% to 50% by mass.

In the structure (1), besides nickel (Ni), tin (Sn), and chromium (Cr), one or more additive elements are allowed to be intentionally or unavoidably included in the porous metal body as long as the problem described above can be resolved. Furthermore, in the embodiment of the present invention, the surface of the porous metal body refers to a surface of a skeleton of the porous metal body that can be visually confirmed when viewed from one surface. Furthermore, the surface of the skeleton refers to an area ranging from the outermost surface of the skeleton to a depth of 0.1 to 10 μm.

(3) According to another embodiment of the present invention, a method for manufacturing a porous metal body for a fael cell includes a step of forming a tin plating layer by tin plating on a sheet-shaped porous metal body which includes at least nickel, and a step of forming a chromium plating layer by chromium plating on at least one surface of the porous metal body which has been provided with the tin plating layer.

(4) According to another embodiment of the present invention, a method for manufacturing a porous metal body for a fuel cell includes a step of forming a nickel plating layer by nickel plating on a sheet-shaped porous metal body which includes at least tin, and a step of forming a chromium plating layer by chromium plating on at least one surface of the porous metal body which has been provided with the nickel plating layer.

Advantageous Effects of Invention

According to the present invention, it is possible to inexpensively provide a porous metal body which is usable for an electrode of a fuel cell and which has excellent corrosion resistance.

DESCRIPTION OF EMBODIMENTS

First, contents of embodiments of the present invention are enumerated and described.

(1) According to an embodiment of the present invention, a porous metal body for a fuel cell, which is a sheet-shaped porous metal body, includes at least nickel, tin, and chromium, in which the chromium concentration of at least one surface of the porous metal body is 3% to 50% by mass.

According to the invention described in (1), it is possible to inexpensively provide a porous metal body which has excellent corrosion resistance and which is usable even in an environment exposed to a highly corrosive acid, such as in an electrode of a fuel cell.

(2) Furthermore, in the porous metal body, preferably, the chromium concentration of one surface is higher than the chromium concentration of another surface.

In the sheet-shaped porous metal body described in (2) in which there is a difference in chromium concentration between one surface and the other surface, by placing the porous metal body in a fuel cell such that the surface having a high chromium concentration is on the side in contact with an MEA, corrosion resistance due to chromium can be exhibited. Furthermore, it is possible to decrease the amount of chromium added compared with the case where the chromium concentration is increased at both surfaces of the porous metal body, and therefore, it is possible to provide the porous metal body more inexpensively.

(3) According to another embodiment of the present invention, a method for manufacturing a porous metal body for a fuel cell includes a step of forming a tin plating layer by tin plating on a sheet-shaped porous metal body which includes at least nickel, and a step of forming a chromium plating layer by chromium plating on at least one surface of the porous metal body which has been provided with the tin plating layer.

(4) According to another embodiment of the present invention, a method for manufacturing a porous metal body for a fuel cell includes a step of forming a nickel plating layer by nickel plating on a sheet-shaped porous metal body which includes at least tin, and a step of forming a chromium plating layer by chromium plating on at least one surface of the porous metal body which has been provided with the nickel plating layer.

According to the invention described in (3) or (4), it is possible to manufacture a porous metal body which can resolve the problem described above.

(5) Furthermore, the method for manufacturing a porous metal body according to the embodiment of the present invention preferably includes a step of heat-treating the porous metal body after the chromium plating layer has been formed thereon or the porous metal body including nickel and tin before the chromium plating layer is formed thereon.

By heat-treating the porous metal body to diffuse nickel and tin, or nickel, tin, and chromium, it is possible to obtain uniform corrosion resistance in the skeleton of the porous metal body.

(6) According to another embodiment of the present invention, a fuel cell includes the porous metal body described in (1) or (2), the porous metal body being used as a current collector.

The porous metal body has an excellent gas diffusion capability due to its high porosity, and furthermore, at least one surface of the porous metal body is composed of a metal having high corrosion resistance. Therefore, in the fuel cell which uses the porous metal body as a current collector, it is possible to efficiently diffuse gas so as to be in contact with a catalyst.

Furthermore, even in a strongly acidic environment during use of the fuel cell, the porous metal body does not corrode, and long-term use is possible.

[Detailed Description of Embodiments of the Present Invention]

Specific examples of a porous metal body and the like according to the embodiments of the present invention will be described below. It is intended that the scope of the present invention is not limited to the examples, but is determined by appended claims, and includes all variations of the equivalent meanings and ranges to the claims.

<Porous Metal Body>

A porous metal body for a fuel cell according to an embodiment of the present invention is sheet-shaped, and the skeleton of the porous metal body includes at least nickel, tin, and chromium, in which the chromium concentration of at least one surface of the sheet-shaped porous metal body is 3% to 50% by mass.

As described above, since at least one surface of the porous metal body is composed of an alloy containing chromium, very high corrosion resistance is exhibited.

Therefore, the porous metal body can be suitably used even in the application in which the porous metal body is exposed to a highly corrosive acid during use, such as in a current collector of a fuel cell.

When the chromium concentration of both surfaces of the porous metal body is less than 3% by mass, corrosion resistance cannot be exhibited sufficiently, which is undesirable. When the chromium concentration is more than 50% by mass, electrical resistance increases, which is undesirable. From this viewpoint, the chromium concentration of at least one surface of the porous metal body is preferably 5% to 45% by mass, and more preferably 7% to 40% by mass.

The chromium concentration of at least one surface of the porous metal body needs to be in the range described above. Of course, the chromium concentration of both surfaces of the porous metal body may be in the range described above. However, as described above, since chromium has excellent corrosion resistance but high electrical resistance, preferably, the porous metal body is configured such that the chromium concentration of one surface is higher than the chromium concentration of another surface. Thereby, while high corrosion resistance is exhibited by the surface on the side having a high chromium concentration, the current-collecting property can be increased by decreasing electrical resistance of the surface on the opposite side having a low chromium concentration. Furthermore, in a fuel cell, in the case where cells, in each of which the porous metal body is placed such that the surface having a high chromium concentration faces an MEA, are connected in series and stacked, warpage occurs in such a manner that the side having a high chromium concentration of the porous metal body protrudes. Therefore, the risk of short-circuiting is decreased, which is advantageous.

From the viewpoint described above, preferably, the chromium concentration of the surface on the side having a low chromium concentration of the porous metal body is 0% by mass or more and is less than half the chromium concentration of the surface on the side having a high chromium concentration.

Furthermore, preferably, the sheet-shaped porous metal body has a three-dimensional network structure. In this case, the porosity (degree of porosity) of the porous metal body can be easily set to a large value. Furthermore, in the case where the porous metal body is used as a current collector of a fuel cell, the gas-diffusing property can be improved.

<Method for Manufacturing Porous Metal Body>

A porous metal body for a fuel cell according to the embodiment of the present invention is provided by a method for manufacturing a porous metal body including a step of forming a tin plating layer by tin plating on a sheet-shaped porous metal body which includes at least nickel, and a step of forming a chromium plating layer by chromium plating on at least one surface of the porous metal body which has been provided with the tin plating layer.

Furthermore, a porous metal body for a fuel cell according to the embodiment of the present invention is provided by a method for manufacturing a porous metal body for a fuel cell including a step of forming a nickel plating layer by nickel plating on the surface of a sheet-shaped porous metal body which includes at least tin, and a step of forming a chromium plating layer by chromium plating on at least one surface of the porous metal body which has been provided with the nickel plating layer.

As described above, in the method for manufacturing a porous metal body for a fuel cell according to the embodiment of the present invention, each of the metal plating layers is formed by a plating process, and chromium plating is performed last. That is, the porous metal body before being chromium-plated may be a porous metal body including nickel which has been tin-plated or a porous metal body including tin which has been nickel-plated.

Note that the porous metal body including nickel and the porous metal body including tin each may have a resin molded body inside the skeleton.

The individual steps will be described in more detail below.

(Preparation of Porous Metal Body Including Nickel)

First, a porous metal body including nickel is prepared and shaped into a sheet. The porous metal body according to the embodiment of the present invention is suitably used as a current collector of a fuel cell or the like, and therefore preferably is sheet-shaped. As long as the porous metal body is sheet-shaped, it may be quadrangular or circular.

As the porous metal body including nickel, a known or commercially available material may be employed. As the commercially available material, for example, Celmet (registered trademark) manufactured by Sumitomo Electric Industries, Ltd. can be suitably used.

Furthermore, a porous metal body including nickel can be manufactured, for example, in the following manner.

—Preparation of Resin Molded Body Serving as Substrate—

First, a porous resin molded body is prepared as a substrate. Any resin may be selected as a material for the resin molded body, and a resin foam molded body of polyurethane, melamine, polypropylene, polyethylene, or the like can be suitably used.

Although expressed as the resin foam molded body, a resin molded body having any shape can be selected as long as it has continuous pores (interconnected pores). For example, a body having a nonwoven fabric-like shape in which resin fibers are entangled with each other can be used instead of the resin foam molded body.

As described above, the resin molded body is not particularly limited as long as it is a porous body having interconnected pores, but preferably has a three-dimensional network structure. This makes it possible to produce a porous metal body having a three-dimensional network structure.

A urethane foam and a melamine foam have a high porosity, an interconnecting property of pores, and excellent heat decomposability, and therefore can be suitably used as a resin molded body. A urethane foam is preferable in terms of uniformity of pores, easy availability, and the like, and further from the standpoint that a resin molded body having a small pore size can be obtained.

In many cases, the resin molded body has residues, such as a foaming agent and unreacted monomers, in the foam production process, and it is preferable to carry out cleaning treatment for the subsequent steps. The resin molded body has a three-dimensional network structure as a skeleton, and thus, as a whole, has continuous pores. The skeleton of the urethane foam has a substantially triangular shape in a cross section perpendicular to the direction in which the skeleton extends.

Preferably, the resin molded body has a porosity of 80% to 98% and a pore size of 50 to 500 μm.

The porosity is defined by the following formula:

$$\text{Porosity}=(1-(\text{weight of porous material [g]}/(\text{volume of porous material [cm}^3\text{]} \times \text{material density})))\times 100\ [\%]$$

Furthermore, the pore size is determined by a method in which a magnified surface of a resin molded body is obtained by a photomicroscope or the like, the number of pores per inch (25.4 mm) is calculated as the number of cells, and an average value is obtained by the formula: average pore size=25.4 mm/number of cells.

The porosity of the resin molded body is not particularly limited, but may be appropriately selected according to the intended use, and is usually 60% to 98% and preferably 80% to 96%.

The thickness of the resin molded body is not particularly limited, but may be appropriately selected according to the intended use, and is usually 150 to 5,000 μm, preferably 200 to 2,000 μm, and more preferably 300 to 1,200 μm.

—Impartment of Conductivity to Surface of Resin Molded Body—

In order to form a nickel plating layer by electrolytic plating on the surface of the resin molded body, the surface of the resin molded body needs to have conductivity. Therefore, it is preferable to form a conductive coating layer by subjecting the surface of the resin molded body to electrical conduction treatment in advance.

The electrical conduction treatment is not particularly limited as long as it can provide a layer having conductivity on the surface of the resin molded body, and any method may be selected, for example, electroless plating of a conductive metal such as nickel, vapor deposition, sputtering, or application of a conductive coating material containing conductive particles of carbon or the like.

Specific examples of electroless plating treatment using nickel include a method in which the resin molded body is immersed in a known electroless nickel plating bath, such as an aqueous solution of nickel sulfate containing sodium hypophosphite. Furthermore, as necessary, the resin molded body may be immersed in an activating solution containing a minute amount of palladium ions (cleaning liquid manufactured by Japan Kanigen Co., Ltd.) before being immersed in the plating bath.

Specific examples of sputtering treatment using nickel include a method in which the resin molded body is fixed on a substrate holder, then by applying DC voltage between the substrate holder and a target (nickel) while introducing inert gas, ionized inert gas is made to collide with nickel, and sputtered nickel particles are deposited on the surface of the resin molded body.

Specific examples of application of a conductive coating material such as carbon particles include a method in which a mixture of conductive powder (e.g., powder of a metal material such as stainless steel, or powder of carbon such as crystalline graphite or amorphous carbon black) and a binder is applied onto the surface of the resin molded body.

The coating weight of the conductive coating layer (deposition amount on the resin molded body) is not particularly limited. For example, in the case where nickel is used as the conductive coating layer, the coating weight is usually 5 to 15 g/m$^2$ and preferably 7 to 10 g/m$^2$.

—Formation of Nickel Plating Layer—

In order to form a nickel plating layer on the surface of the resin molded body, a known plating process can be used, and in particular, an electroplating process is preferably used. If the thickness of the plating film is increased by the electroless plating treatment and/or sputtering treatment described above, it may not be necessary to form a nickel plating layer. However, this is not desirable from the viewpoint of productivity and cost. Therefore, preferably, a method is employed in which, as described above, first, the porous resin molded body having interconnected pores is subjected to electrical conduction treatment, and then a nickel plating layer is formed by an electroplating process.

The nickel electroplating treatment may be performed in the usual manner. As the plating bath, a known or commercially available plating bath can be used. Examples thereof include a Watt's bath, a chloride bath, and a sulfamate bath. The resin molded body having the conductive coating layer formed on the surface thereof by electroless plating, sputtering, or the like is immersed in the plating bath, and with the resin molded body being connected to a cathode and a nickel counter electrode plate being connected to an anode, a direct current or pulsed inteimittent current is passed therebetween. Thereby, a nickel plating layer can be formed further on the conductive coating layer.

The nickel plating layer may be formed to such an extent that conductive coating layer is not exposed, and the coating weight thereof is not particularly limited. The coating weight of the nickel is usually about 100 to 1,000 g/m$^2$ and preferably about 200 to 800 g/m$^2$.

(Formation of Tin Plating Layer)

A tin plating layer is formed on the surface of the porous metal body including nickel which is commercially available or obtained as described above. Note that the porous metal body including nickel may include the resin molded body as a substrate, or the resin molded body may have been removed by performing heat treatment or the like.

In order to form a tin plating layer on the surface of the porous metal body including nickel, a known plating process can be employed. As the tin plating bath, a known or commercially available plating bath can be used. Examples thereof include a sulfate bath, an organic acid bath, and an alkaline bath. The porous metal body including nickel is immersed in the tin plating bath, and with the porous metal body being connected to a cathode and a tin counter electrode plate being connected to an anode, a direct current or pulsed intermittent current is passed therebetween. Thereby, a tin plating layer can be formed on the surface of the porous metal body.

The coating weight of the tin plating layer (tin deposition amount) is not particularly limited, and is preferably 5% to 25% by mass, and more preferably 10% to 20% by mass, of the overall coating weight of the porous metal body.

Furthermore, in order to improve adhesion of tin plating to the porous metal body including nickel, it is desirable to clean the porous metal body by performing strike nickel plating immediately before tin plating and to place the porous metal body, in the undried wet state, into the tin plating solution. Thereby, it is possible to enhance adhesion of the tin plating layer.

The conditions for the strike nickel plating, for example, may be set as follows. That is, a Wood's strike nickel bath having a composition containing 240 g/L of nickel chloride and 125 ml/L of hydrochloric acid (having a specific gravity of about 1.18) is prepared, whose temperature is adjusted to room temperature, and nickel or carbon is used as an anode.

In such a manner, it is possible to obtain a porous metal body including nickel and tin. By performing chromium plating on at least one surface of the porous metal body, it is possible to obtain a porous metal body for a fuel cell according to the embodiment of the present invention.

The method for obtaining the porous metal body including nickel and tin has been described above, in which the porous metal body including nickel is prepared and tin plating is performed on the surface of the porous metal body including nickel. It is also possible to obtain a porous metal body including nickel and tin by preparing a porous metal body including tin and performing nickel plating on the surface of the porous metal body including tin. A method in which a porous metal body including tin is prepared and nickel plating is performed on the surface of the porous metal body including tin will be briefly described below.

(Preparation of Porous Metal Body Including Tin)

The porous metal body including tin preferably has a three-dimensional network structure as in the porous metal body including nickel. In order to obtain such a porous metal body, as in the case of manufacturing the porous metal body including nickel, first, a resin molded body serving as a substrate is prepared, and the surface of the resin molded body is subjected to electrical conduction treatment. Then, instead of foaming the nickel plating layer, a tin plating layer is foamed on the surface of the resin molded body which has been subjected to electrical conduction treatment. The conditions for forming a tin plating layer may be set to be the same as those in the case where the tin plating layer is formed on the surface of the porous metal body including nickel described above.

(Formation of Nickel Plating Layer)

Subsequently, by forming a nickel plating layer on the surface of the porous metal body including tin produced as described above, it is possible to obtain a porous metal body including nickel and tin. The conditions for forming a nickel plating layer may be set to be the same as those in the case where the nickel plating layer is formed on the surface of the resin molded body which has been subjected to electrical conduction treatment described above.

(Formation of Chromium Plating Layer)

A chromium plating layer is formed on the surface of the porous metal body including nickel and tin which is obtained by forming the tin plating layer on the surface of the porous metal body including nickel or by forming the nickel plating layer on the surface of the porous metal body including tin. As the method for forming the chromium plating layer, a known plating process can be employed, and although the method is not particularly limited, use of an electroplating process is preferable. If the thickness of the plating film is increased by sputtering treatment, it may not be necessary to use electroplating treatment. However, this is not desirable from the viewpoint of productivity and cost.

Furthermore, the chromium plating layer is formed such that the chromium concentration of at least one surface of the porous metal body is 3% to 50% by mass. The chromium plating layer may be formed such that the chromium concentration of surfaces on both sides of the sheet-shaped porous metal body is in the range described above. However, as described above, preferably, the chromium plating layer is formed such that the chromium concentration of one surface of the porous metal body is higher than the chromium concentration of another surface. In order to set the chromium concentration of at least one surface of the porous metal body in the range described above, for example, a chromium plating layer may be formed, for example, by performing plating with a chromium electrode being placed only on the side to which chromium is to be attached. In the case where the chromium plating layer is formed on the surface on each side of the porous metal body, plating may be performed by placing chromium electrodes on both sides of the porous metal body in a plating tank. In the case where the chromium plating layer is formed only on one surface of the porous metal body, plating may be performed by placing a chromium electrode only on one side of the porous metal body in a plating tank. Furthermore, in the case where the chromium plating layer is formed only on one side of the porous metal body, it is preferable to stop stirring of the plating solution.

The chromium plating layer may be formed by a known chromium plating process. As the plating bath, a known or commercially available plating bath can be used. Examples thereof include a hexavalent chromium bath and a trivalent chromium bath. The resin molded body provided with the tin plating layer is immersed in the chromium plating bath and connected to a cathode, a chromium plate serving as a counter electrode is connected to an anode, and a direct current or pulsed intermittent current is passed therebetween. Thereby, a chromium plating layer can be formed.

(Heat Treatment)

The method for manufacturing a porous metal body according to the embodiment of the present invention preferably includes a step of heat-treating the porous metal body after the chromium plating layer has been formed thereon or the porous metal body including nickel and tin before the chromium plating layer is formed thereon. Thereby, the metals are diffused in the skeleton of the porous metal body, and a variation in corrosion resistance can be suppressed.

The heat treatment can be performed in an inert atmosphere (reduced pressure, nitrogen, argon, or the like) or in a reducing atmosphere (hydrogen). If the heat treatment temperature is too low, diffusion will take a long time. If the heat treatment temperature is too high, softening will occur and the porous structure can be damaged by its own weight. Therefore, preferably, the heat treatment is performed in the range of 900° C. to 1,300° C. Furthermore, preferably, the heat treatment is performed in a reducing atmosphere. The range of heat treatment temperature is more preferably 1,000° C. to 1,300° C., and still more preferably 1,100° C. to 1,250° C.

Furthermore, in the case where the resin molded body serving as the substrate remains in the center of the skeleton of the porous metal body, the resin molded body is removed by burning in this heat treatment step.

<Fuel Cell>

A fuel cell according to an embodiment of the present invention uses the porous metal body according to the embodiment of the present invention as a current collector. The fuel cell according to the embodiment of the present invention will be described below, taking as an example a polymer electrolyte fuel cell (PEFC) structure.

A polymer electrolyte fuel cell according to an embodiment of the present invention has a basic structure in which the porous metal body is provided as a gas diffusion layer and current collector on each of both sides of a membrane electrode assembly (MEA) including a polymer electrode membrane and catalyst electrodes. Hydrogen serving as a fuel is supplied to one of the porous metal bodies, and oxygen is supplied to the other porous metal body. Carbon paper may be disposed between the MEA and the porous metal body.

In the MEA, the porous metal body is disposed such that the surface having a chromium concentration of 3% to 50% by mass faces the catalyst electrode side. Thereby, the porous metal body exhibits corrosion resistance to a strong acid generated from the polymer electrode membrane during use, and corrosion can be suppressed.

EXAMPLES

The present invention will be described in more detail below on the basis of examples. However, the examples are merely illustrative and the porous metal body of the present invention is not limited thereto. It is intended that the scope of the present invention is determined by appended claims, and includes all variations of the equivalent meanings and ranges to the claims.

Example 1

Electrical Conduction Treatment of Resin Molded Body having Three-dimensional Network Structure A polyurethane sheet having a thickness of 1.5 mm was used as a resin molded body having a three-dimensional network structure. In order to impart conductivity to the surface of the polyurethane sheet, a conductive coating material was prepared, in which 100 g of carbon black, i.e., amorphous carbon, with a particle size of 0.01 to 0.2 μm was dispersed in 0.5 L of a 10% aqueous solution of an acrylic ester resin. The polyurethane sheet was continuously immersed in the coating material and squeezed with rollers, followed by drying. In such a manner, the polyurethane sheet was subjected to electrical conduction treatment. Thereby, a conductive coating layer was formed on the surface of the polyurethane sheet (sheet-shaped resin molded body having a three-dimensional network structure).

(Nickel Plating)

A nickel plating layer was formed on the polyurethane sheet, the surface of which had been subjected to electrical conduction treatment as described above, by performing nickel plating with a coating weight of 300 $g/m^2$. As the plating solution, a nickel sulfamate plating solution was used. The sulfamate bath was an aqueous solution having a nickel sulfamate concentration of 450 g/L and a boric acid concentration of 30 g/L, and the pH thereof was adjusted to 4. Then, nickel plating was performed at a temperature of 55° C. and a current density of 20 ASD ($A/dm^2$). Thereby, a porous metal body including nickel was obtained.

(Tin Plating)

A tin plating layer was formed on the surface of the porous metal body including nickel produced as described above by performing tin plating with a coating weight of 56 $g/m^2$. The tin plating solution used had a composition including 55 g/L of stannous sulfate, 100 g/L of sulfuric acid, 100 g/L of cresol sulfonic acid, 2 g/L of gelatin, and 1 g/L of β-naphthol relative to 1,000 g of water. Furthermore, the temperature of the plating bath was set at 20° C., and the anode current density was set at 1 $A/dm^2$.

(Removal of Resin Molded Body)

By heating the porous metal body including nickel and tin in air at 1,000° C. for 15 minutes, the substrate (polyurethane sheet) was removed by burning. Since the porous metal body was partially oxidized at this time, reduction treatment was further performed in a reducing (hydrogen) atmosphere at 1,000° C. for 20 minutes.

(Chromium Plating)

A chromium plating layer was formed with a coating weight of 25 $g/m^2$ on one surface of the porous metal body including nickel and tin produced as described above. Thereby, a porous metal body 1 was obtained. At this time, the chromium concentration of the one surface of the porous metal body 1 was 30% by mass when measured by fluorescent X-ray analysis using a component analyzer (Niton XL3t-700, manufactured by Thermo Fisher Scientific Inc). The chromium concentration of the opposite surface of the porous metal body 1 was 3.7% by mass when measured in the same manner.

As the chromium plating solution, a trivalent chromium plating solution was used. Furthermore, the temperature of the plating bath was set at 30° C., and the anode current density was set at 12 $A/dm^2$.

Example 2

A porous metal body 2 was produced as in Example 1 except that the chromium plating layer was formed with a coating weight of 5 g/m², and the chromium concentration of one surface of the porous metal body was 4.1% by mass. The chromium concentration of the opposite surface of the porous metal body 2 was 1.3% by mass.

Example 3

A porous metal body 3 was produced as in Example 1 except that the chromium plating layer was formed with a coating weight of 10 g/m², and the chromium concentration of one surface of the porous metal body was 11% by mass. The chromium concentration of the opposite surface of the porous metal body 3 was 1.7% by mass.

Example 4

A porous metal body 4 was produced as in Example 1 except that the chromium plating layer was formed with a coating weight of 18 g/m², and the chromium concentration of one surface of the porous metal body was 21% by mass. The chromium concentration of the opposite surface of the porous metal body 4 was 2.2% by mass.

Example 5

A porous metal body 5 was produced as in Example 1 except that the chromium plating layer was formed with a coating weight of 65 g/m², and the chromium concentration of one surface of the porous metal body was 49% by mass. The chromium concentration of the opposite surface of the porous metal body 5 was 4.3% by mass.

Example 6

A porous metal body 1 produced as in Example 1 was further subjected to the following heat treatment.
(Heat Treatment)
A porous metal body 6 was obtained by heating the porous metal body 1 in a hydrogen atmosphere at 1,100° C. In the heat treatment, the holding time at 1,100° C. was set at 30 minutes. The chromium concentration of one surface of the porous metal body 6 was 26% by mass. The chromium concentration of the opposite surface of the porous metal body 6 was 3.1% by mass.

Comparative Example 1

A porous metal body 7 was produced as in Example 1 except that the chromium plating layer was formed with a coating weight of 2 g/m², and the chromium concentration of one surface of the porous metal body was 1.6% by mass. The chromium concentration of the opposite surface of the porous metal body 7 was 0.3% by mass.

Comparative Example 2

A porous metal body 8 was produced as in Example 1 except that the chromium plating layer was formed with a coating weight of 97 g/m², and the chromium concentration of one surface of the porous metal body was 54% by mass. The chromium concentration of the opposite surface of the porous metal body 8 was 2.8% by mass.
(Evaluation of Fuel Cell)
Using the porous metal bodies 1 to 8 produced in Examples 1 to 6 and Comparative Examples 1 and 2, polymer electrolyte fuel cells were each produced as described below.

First, an MEA having catalyst electrode portions with a size of 5 cm×5 cm was prepared, carbon paper, which had been subjected to water-repellent finishing, having a size of 5 cm×5 cm was placed on both sides thereof, and porous metal bodies with a size of 5 cm×5 cm were placed on the outer sides thereof such that the chromium-plated sides faced the MEA. The whole body was covered with a carbon molded case. Thus, fuel cells 1 to 8 were obtained.

The fuel cells 1 to 8 produced as described above were operated at a temperature of 80° C. for 100 hours, at a constant current density of 0.2 A/cm², and the voltage was checked. Furthermore, in order to evaluate corrosion resistance, the fuel cell was disassembled after operating for 100 hours, and by mapping the surface on the Celmet side of the carbon paper with energy dispersive X-ray analysis (EDX; S-3400N manufactured by Hitachi), it was checked whether or not dissolution of nickel, tin, and chromium occurred. The EDX analysis was performed at an acceleration voltage of 15 kV. The results thereof are shown in Table I below.

TABLE I

| | Surface chromium concentration (mass %) | | Operating voltage | Metal concentration (at %) | | |
|---|---|---|---|---|---|---|
| | One surface | Opposite surface | (V) | Nickel | Tin | Chromium |
| Metal porous body 1 | 30 | 3.7 | 0.71 | 0.025 | 0.005 | Not more than detection limit |
| Metal porous body 2 | 4.1 | 1.3 | 0.78 | 0.070 | 0.010 | Not more than detection limit |
| Metal porous body 3 | 11 | 1.7 | 0.76 | 0.042 | 0.006 | Not more than detection limit |
| Metal porous body 4 | 21 | 2.2 | 0.73 | 0.036 | 0.005 | Not more than detection limit |
| Metal porous body 5 | 49 | 4.3 | 0.70 | 0.015 | 0.003 | Not more than detection limit |
| Metal porous body 6 | 26 | 3.1 | 0.73 | 0.019 | 0.004 | Not more than detection limit |
| Metal porous body 7 | 1.6 | 0.3 | 0.79 | 1.81 | 0.023 | Not more than detection limit |
| Metal porous body 8 | 54 | 2.8 | 0.37 | 0.011 | 0.002 | Not more than detection limit |

The invention claimed is:
1. A porous metal body, which is a single sheet-shaped porous metal body, comprising at least nickel, tin, and chromium, the sheet-shaped porous metal body having a first surface and a second surface, the first surface and the second surface being on opposite sides of the sheet-shaped porous metal body in a thickness direction of the sheet-shaped porous metal body,
   wherein the chromium concentration of at least one of the first surface and the second surface of the porous metal body is 3% to 50% by mass, wherein the chromium concentration of the first surface of the porous metal body is higher than the chromium concentration of the second surface of the porous metal body such that the chromium concentration varies from the first surface to the second surface in the thickness direction of the sheet-shaped porous metal body, and wherein the porous metal body is a part of a fuel cell.

2. The porous metal body according to claim 1, wherein the first surface is in direct contact with a membrane electrode assembly of a fuel cell.

3. The porous metal body according to claim 1, wherein the chromium concentration of the at least one of the first surface and the second surface of the porous metal body is 7% to 40% by mass.

4. The porous metal body according to claim 1, wherein the porous metal body is used as a current collector.

5. The porous metal body according to claim 1, wherein the chromium concentration of each of the first surface and the second surface of the porous metal body is 3% to 50% by mass.

* * * * *